United States Patent [19]

Hudson

[11] Patent Number: 5,060,329
[45] Date of Patent: Oct. 29, 1991

[54] THREE IN ONE TWEEZER

[76] Inventor: Vonnie L. Hudson, 54 First Ave., Westbury, N.Y. 11590

[21] Appl. No.: 595,554

[22] Filed: Oct. 11, 1990

[51] Int. Cl.⁵ ............................ B25F 1/00; H02G 1/12
[52] U.S. Cl. ............................................ 7/107; 7/129; 7/132; 294/99.2; 30/90.1
[58] Field of Search .................. 7/107, 900, 125, 129, 7/130, 127, 132, 133; 81/9.4, 9.44; 294/99.2, 2, 3; 30/90.1, 91.2, 28

[56] References Cited

U.S. PATENT DOCUMENTS

| | | | |
|---|---|---|---|
| 1,456,844 | 5/1923 | De Bie | 294/99.2 |
| 3,771,222 | 11/1973 | Sakuma | 7/107 |
| 3,825,961 | 7/1974 | Klein | 30/28 |
| 4,006,502 | 2/1977 | Strickland | 7/107 |
| 4,081,871 | 4/1978 | Knuth | 7/107 |
| 4,189,799 | 2/1980 | Litehizer | 7/107 |
| 4,337,542 | 7/1982 | Theiler | 7/107 |
| 4,660,241 | 4/1987 | Chen et al. | 7/107 |
| 4,932,124 | 6/1990 | Pyun | 7/107 |

*Primary Examiner*—Roscoe V. Parker
*Attorney, Agent, or Firm*—Richard L. Miller

[57] ABSTRACT

This three in one tweezer is a tool that is designed to cut wire, pick up small articles, and strip insulation from ends of wires of various gages. The tool utilizes a pair of spring members that are fastened together by a collar leaving tweezer portions at one end and a cutter at the other end. A pair of ribs are secured to the insides of the tweezer portions and are provided with a multiple number of spaced semi-circular openings of different wire gage sizes, for accommodating various sizes of insulated wire to be stripped at ends.

2 Claims, 1 Drawing Sheet

U.S. Patent      Oct. 29, 1991      5,060,329
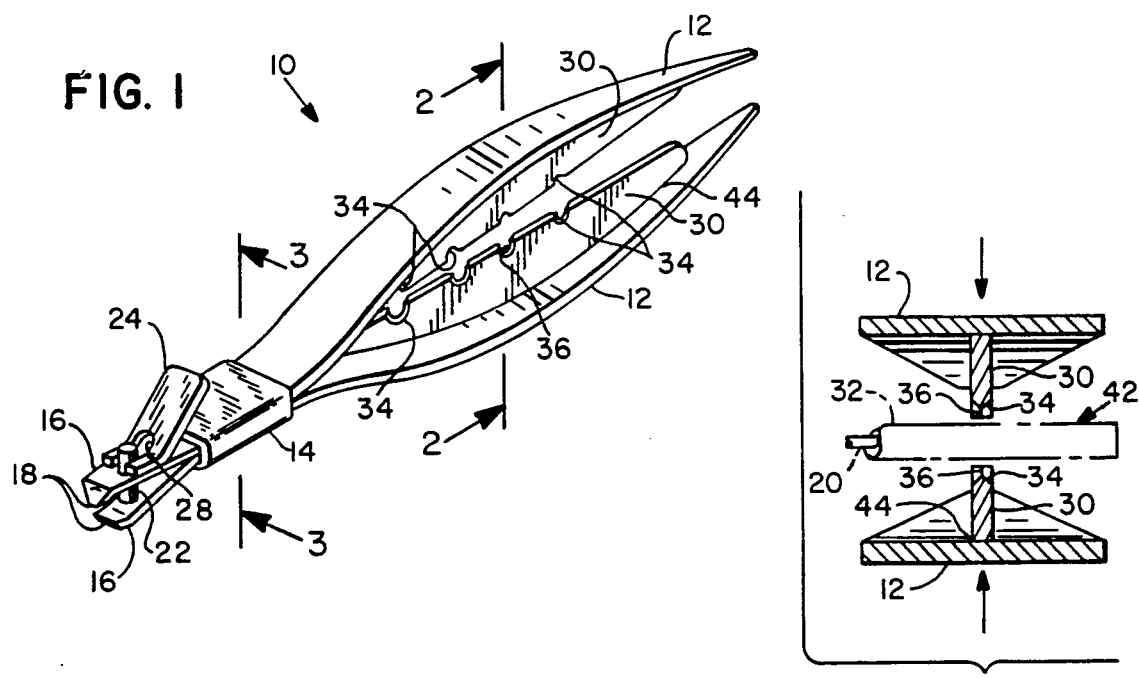
FIG. 1
FIG. 2
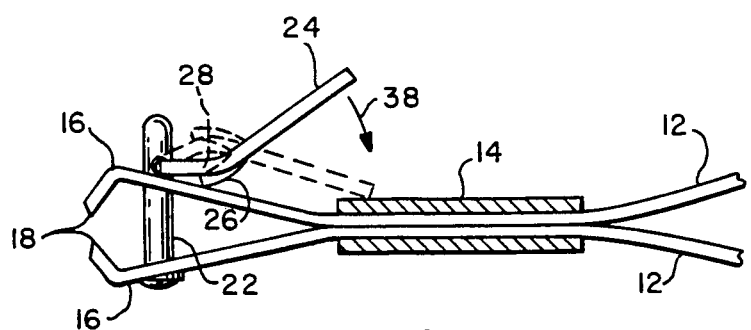
FIG. 3

THREE IN ONE TWEEZER

BACKGROUND OF THE INVENTION

The instant invention relates generally to wire stripper devices, and more particularly, to a three in one.

Numerous stripper devices have been provided in the prior art that are adapted to strip insulation from wires. For example, U.S. Pat. Nos. 4,006,502 to Strickland; 4,081,871 to Knuth; 4,189,779 Litehizer, Jr.; 4,337,542 to Theiler, Sr. and 4,660,241 to Chen et al all are illustrative of such prior art. While these units may be suitable for the particular purpose to which they address, they would not be as suitable for the purpose of the present invention as hereafter described.

SUMMARY OF THE INVENTION

A primary object of the present invention is to provide a three in one tweezer that will overcome the shortcomings of the prior art devices.

Another object is to provide a three in one tweezer that will be so designed, as to have a jaw assembly on one end for cutting wire, while dressing wires and conductors may be accomplished with a tweezer portion on the other end of the instant invention.

An additional object is to provide a three in one tweezer that will also be designed to strip wire of various diameters accurately.

A further object is to provide a three in one tweezer that is simple and easy to use.

A still further object is to provide a three in one tweezer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the instant invention;

FIG. 2 is an enlarged cross sectional view taken on line 2—2 of FIG. 1, illustrating a length of insulated wire in phantom about to be stripped, and FIG. 3 is a fragmentary cross sectional side elevational view taken on line 3—3 on FIG. 1.

DETAILED DESCRIPTION OF THE PREFERRED EMBODIMENTS

Turning now descriptively to the drawings, in which like reference characters denote like elements throughout the several views, a tool 10 is shown to include a pair of spring steel members 12 that are bound together near one end at a flat portion by a collar 14 that is fixedly secured thereto. An end of spring steel members 12 normally are biased outwardly from each other and are in the form of a pair of normally open jaws 16 that slope towards each other and include cutting edges 18 for severing conductor 20 or insulated wire 42.

A post 22 is pivotally secured at a head portion to one jaw 16, and a finger lever 24 is pivotal and foldable attached to the post 22 for the operation of the jaws 16, and a curved cam portion 26 is integrally formed at the curved portion 28 of finger lever 24 and sliding engages with a surface of one jaw 16 to force this jaw 16 downward to cut off a conductor 20 or insulated wire 42.

The opposite ends of member 12 are tapered and curved and form tweezer portions that also normally biased outwardly from each other by the inherent spring tension of members 12, and ribs 30 are each have a side edge 44 fixedly secured at one longitudinal side concave surface of each of the tweezer portions. The ribs 30 align with each other for the purpose of striping insulation 32 from conductor 20.

The pair of ribs 30 are provided with a plurality of spaced apart semi-circular openings 34 for receiving insulated wire 32 of different gage sizes, for stripping insulation therefrom by the cutting edges 36 provided in the openings 34.

In use, a length of wire 42 is cut from a longer piece by placement between the pair of jaws 16. Finger pressure is applied to lever 24, causing lever 24 to pivot clockwise as indicated by arrow 38 and causes the cam portion 26 to urge the engaged jaw 18 to close against the other jaw 16, resulting in the wire 42, there so inserted between jaws but not illustrated, being cut. When the jaws 18 are not being used, finger lever 24 is lifted upward, pivoted 180°, and folded downward on the tool 10, as is best seen illustrated in phantom in FIG. 3.

When it is desired to remove a portion of the insulation 32 from a wire 42, the tweezer portions formed at the other end of the tool 10 are pressed together by the operator after placing the wire 42 in the appropriate size openings 34 of the ribs 30.

The closing of the ribs 30 together causes a sufficient cutting through of the insulation 32 down to the bare conductor 20, after which, the operator maintains his pressure upon the tweezer portion while gripping the longer portion of the wire 42. He then proceeds to pull the tool 10 away from the longer portion of the wire 42, resulting in a small piece of insulation 32 being stripped away and leaving the end of the wire 42 with the bare conductor 20 exposed. In the case where large very tough insulation 32 needs to be striped from the wire 42 the operator can actually place his fist around the instant invention 10 with the wire 42 extending typical but not necessarily his/her middle and ring fingers and pull with greater control while exerting more force then he might otherwise be able to do in order to accomplish the striping.

The tweezer point portions 40 of tool 10 are employed by the operator gripping tapered and curved members 12 and squeezing them together to grip a conductor 20 or insulated wire 42, or other articles between the tapered ends thereof.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A three in one tweezer tool which comprises:
   (a) two spring members;
   (b) jaws for cutting wire, wherein said jaws for cutting wire each have a cutting edge and are integrally attached to said spring members on one end and are formed in a normally open condition and are closed by finger pressure on a finger operated lever having an underside cam that engages with a surface of a first jaw of said jaws, said cam urging said first jaw against a second jaw of said jaws when said finger pressure is applied to said operating lever, and said lever is pivotally received on a post received through said first jaw and rotatively secured to a second jaw of said jaws;

(c) fastening means for securing said spring members together, wherein said fastening means is a collar fixedly secured adjacent to said jaws for cutting wire;

(d) tweezer means for picking up wire and other articles, wherein said tweezers means is a pair of inwardly curved and normally open tweezer portions integrally attached to another end of said spring members, and operated when finger pressure is applied to said tweezer portions to grasp said wire or other articles in a tweezer point portion of said tweezer; and (e) a wire stripping means for removing insulation from insulated wires.

2. A three in one tweezer tool as recited in claim 1, wherein said wire stripping means are a pair of ribs and a longitudinal side edge of said pair of ribs is fixedly secured to a concave surface of said tweezer portions, and another longitudinal side edge of said pair of ribs is provided with a plurality of spaced apart semicircular openings, each having a cutting edge that slices insulation of a wire to a bare outer periphery of a conductor when said wire is placed in a pair of mating openings of said pair of ribs and operator pressure is applied to a convex surfaces of said tweezer portions, whereby sliced insulation may stripped away by an operator holding said tweezer portions closed and pulling said tool away from a longer length of said wire being held in another hand of said operator.

* * * * *